United States Patent
Gregg

(10) Patent No.: US 7,519,761 B2
(45) Date of Patent: Apr. 14, 2009

(54) TRANSPARENT PCI-BASED MULTI-HOST SWITCH

(75) Inventor: Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 11/548,001

(22) Filed: Oct. 10, 2006

(65) Prior Publication Data

US 2008/0086584 A1    Apr. 10, 2008

(51) Int. Cl.
*G06F 13/00*    (2006.01)
*G06F 3/00*    (2006.01)

(52) U.S. Cl. .................. 710/316; 710/312; 710/317; 710/1

(58) Field of Classification Search ............ 710/312
See application file for complete search history.

(56) References Cited

U.S. PATENT DOCUMENTS

| | | | | |
|---|---|---|---|---|
| 6,968,415 | B2* | 11/2005 | Bronson et al. | 710/306 |
| 7,058,738 | B2* | 6/2006 | Stufflebeam, Jr. | 710/104 |
| 7,096,305 | B2* | 8/2006 | Moll | 710/312 |
| 7,146,452 | B2* | 12/2006 | Brocco et al. | 710/312 |
| 7,188,209 | B2* | 3/2007 | Pettey et al. | 710/317 |
| 7,293,129 | B2* | 11/2007 | Johnsen et al. | 710/313 |
| 7,356,636 | B2* | 4/2008 | Torudbakken et al. | 710/313 |
| 7,363,404 | B2* | 4/2008 | Boyd et al. | 710/104 |
| 2003/0005039 | A1 | 1/2003 | Craddock et al. | 709/203 |
| 2004/0151175 | A1 | 8/2004 | Moll et al. | 370/389 |
| 2004/0151188 | A1 | 8/2004 | Maveli et al. | 370/398 |
| 2004/0186942 | A1 | 9/2004 | Olarig | 710/313 |
| 2004/0221195 | A1 | 11/2004 | Mizutani et al. | 714/12 |
| 2004/0260842 | A1* | 12/2004 | Pettey et al. | 710/1 |
| 2005/0038947 | A1 | 2/2005 | Lueck et al. | 710/315 |
| 2005/0080976 | A1* | 4/2005 | Brocco et al. | 710/316 |
| 2005/0102549 | A1 | 5/2005 | Davies et al. | 714/4 |
| 2005/0117578 | A1* | 6/2005 | Stewart et al. | 370/389 |
| 2005/0246460 | A1* | 11/2005 | Stufflebeam, Jr. | 710/104 |
| 2005/0270988 | A1* | 12/2005 | DeHaemer | 370/254 |
| 2006/0018342 | A1* | 1/2006 | Pettey et al. | 370/465 |
| 2006/0059165 | A1* | 3/2006 | Bosloy et al. | 707/10 |
| 2006/0123179 | A1* | 6/2006 | Wong et al. | 710/307 |
| 2006/0218336 | A1* | 9/2006 | Ishizawa et al. | 710/316 |

(Continued)

OTHER PUBLICATIONS

PCI Express Base Specification Revision 1.0a, Apr. 15, 2003—428 pages.*

(Continued)

*Primary Examiner*—Paul R Myers
*Assistant Examiner*—Brian T Misiura
(74) *Attorney, Agent, or Firm*—Arthur Ortega, Esq.; Blanche E. Schiller, Esq.; Heslin Rothenberg Farley & Mesiti P.C.

(57) ABSTRACT

A transparent PCI-based multi-host switch. A switch is configured with multiple north facing ports to couple the switch to multiple hosts. The multi-host switch can be included in a variety of switch configurations, including configurations having one multi-host switch, configurations having multiple multi-host switches, and configurations including one or more multi-host switches and one or more single host switches. The switch is designed to include controls to accurately route a packet through the switch.

3 Claims, 12 Drawing Sheets

U.S. PATENT DOCUMENTS

| | | | |
|---|---|---|---|
| 2006/0239287 A1* | 10/2006 | Johnsen et al. | 370/412 |
| 2006/0242330 A1* | 10/2006 | Torudbakken et al. | 710/5 |
| 2006/0242332 A1* | 10/2006 | Johnsen et al. | 710/22 |
| 2006/0242333 A1* | 10/2006 | Johnsen et al. | 710/30 |
| 2006/0242352 A1* | 10/2006 | Torudbakken et al. | 710/312 |
| 2006/0242354 A1* | 10/2006 | Johnsen et al. | 710/316 |
| 2006/0253619 A1* | 11/2006 | Torudbakken et al. | 710/31 |
| 2007/0097950 A1* | 5/2007 | Boyd et al. | 370/351 |
| 2007/0106916 A1* | 5/2007 | Yanagawa | 713/300 |
| 2007/0198763 A1* | 8/2007 | Suzuki et al. | 710/316 |
| 2007/0263642 A1* | 11/2007 | Harriman | 370/401 |
| 2008/0086584 A1* | 4/2008 | Gregg | 710/316 |
| 2008/0137676 A1* | 6/2008 | Boyd et al. | 370/419 |

OTHER PUBLICATIONS

ESE Magazine—"Multi-CPU PCI Express systems with non-transparency", Oct. 2005, 2 pages.*

RTC Magazine—"Enabling Multi-Host System Designs with PCI Express Technology", May 2004, 6 pages.*

"Optimizing PCI Express Switch and Bridge Architectures," Matt Jones, IDT RTC Newsletter, May 2005, http://www.rtcmagazine.com/home/printthis.php?id=100342.

"IDT Unveils Family of PCI Express Solutions," Feb. 28, 2005—IDTT (Integrated Device Technology, Inc.), http://www.nsdnewsletter.com/English/Collaterals/Vendor_Press_Releases/2005/20050228_IDT-PCIXSolutions.pdf.

"PCI-to-PCI Bridge Architecture Specification, Revision 1.2," PCI-SIG, Jun. 9, 2003, available from PCI-SIG (1-800-433-5177), administration@pcisig.com.

* cited by examiner

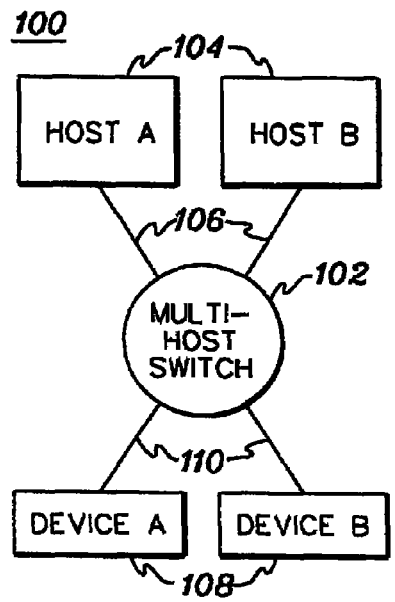
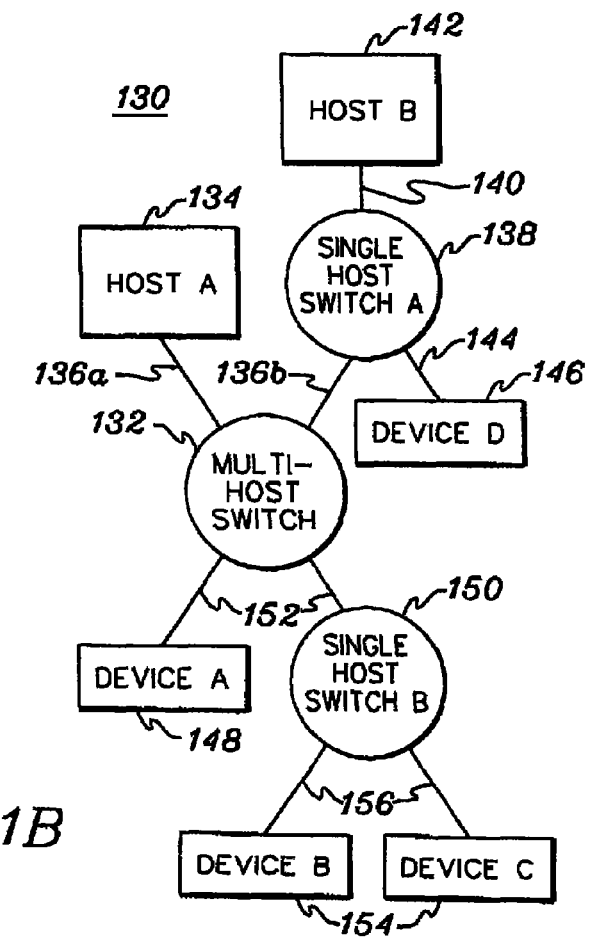
fig. 1A
fig. 1B

REQUESTOR/COMPLETER ID ROUTING

| BUS NUMBER | BRIDGE BUS NUMBER | | | |
|---|---|---|---|---|
| | A | B | C | D |
| PRIMARY | 1 | 5 | 2 | 2 |
| SECONDARY | 2 | 2 | 3 | 4 |
| SUBORDINATE | 4 | 4 | 3 | 4 |
| ROOT COMPLEX | USE PRIMARY | USE PRIMARY | NA | NA |

REQUESTOR/COMPLETER ID ROUTING

| BUS NUMBER | BRIDGE BUS NUMBER | | | | | | | |
|---|---|---|---|---|---|---|---|---|
| | SWITCH CHIP 1 | | | | SWITCH CHIP 2 | | | |
| | A | B | C | D | A | B | C | D |
| PRIMARY | 1 | 5 | 2 | 2 | 5 | 6 | 7 | 7 |
| SECONDARY | 2 | 2 | 3 | 4 | 7 | 7 | 8 | 9 |
| SUBORDINATE | NA | NA | 3 | 4 | NA | NA | 8 | 9 |
| BUS NUMBER BIT ARRAY | 2,3,4,5,6,7,8,9 | 1,2,3,4 | NA | NA | 1,2,3,4,5,7,8,9 | 6,7,8,9 | NA | NA |

930 fig. 9C

TRANSPARENT PCI-BASED MULTI-HOST SWITCH

TECHNICAL FIELD

This invention relates, in general, to routing information within a processing environment, and in particular, to employing a transparent PCI-based multi-host switch in routing packets within the processing environment.

BACKGROUND OF THE INVENTION

Switches are used to communicate between components of a processing environment. In particular, switches are used to route information between hosts of a processing environment and devices of that environment. There are many types of switches, but several popular switches used today are based on the Peripheral Component Interconnect (PCI) architecture, offered by PCI-SIG. These switches include PCI, PCI-X and PCI-Express (PCIe).

A PCI-based switch has a tree structure that enables the switch to be connected to one host. Specifically, the switch has one north facing port that enables the switch to be connected to the one host. The switch also has one or more south facing ports enabling the switch to be connected to one or more devices, such as disk controllers or other input/output devices. This tree structure places various restrictions on the switch, including its ability to connect to only one host.

SUMMARY OF THE INVENTION

Based on the foregoing, a need exists for a PCI-based switch that enables concurrent connection to multiple hosts. For example, a need exists for a PCI-based multi-host switch that enables connection to multiple hosts without requiring changes to the packets flowing through the switch. That is, a need exists for a multi-host PCI-based switch that is transparent. A further need exists for a capability to enable packets to be efficiently and accurately routed through such a switch.

The shortcomings of the prior art are overcome and additional advantages are provided through the provision of a switch that includes, for instance, a first port to couple the switch to a first host of a processing environment; a second port to couple the switch to a second host of the processing environment; and one or more other ports to couple the switch to one or more devices of the processing environment, wherein at least the first port and the second port are operated as PCI based ports and wherein the switch is a transparent switch.

Method and computer program products corresponding to one or more aspects the above-summarized claim are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 1A-1C depict examples of switch configurations including one or more multi-host switches, in accordance with one or more aspects, of the present invention;

FIG. 9C depicts one example of a requestor/completer id routing table for the configuration of FIG. 9A, in accordance with an aspect of the present invention.

BEST MODE FOR CARRYING OUT THE INVENTION

In accordance with an aspect of the present invention, a multi-host switch is provided that enables concurrent connections to multiple hosts of a processing environment. The multi-host switch is based on PCI technology and is a transparent switch. It is transparent in that the packets being routed by the switch are not modified for the routing, including the end-to-end CRC of the packet, and addresses within the switch are not translated.

A switch configuration may include one or more multi-host switches, as well as one or more conventional switches that enable connection to one host. These conventional switches are referred to herein as single host switches.

In the examples herein, the multi-host and single host switches are PCI-Express (PCIe) switches. However, in other embodiments, the switches may be based on other PCI architectures, such as PCI and PCI-X, as well as future PCI architectures. Therefore, the switches are referred to herein as PCI-based switches. Details relating to PCI are described in "PCI-to-PCI Bridge Architecture Specification, Revision 1.2," PCI-SIG, Jun. 9, 2003, available from PCI-SIG (1-800-433-5177), administration@pcisig.com, which is hereby incorporated herein by reference in its entirety.

Figure 1C:
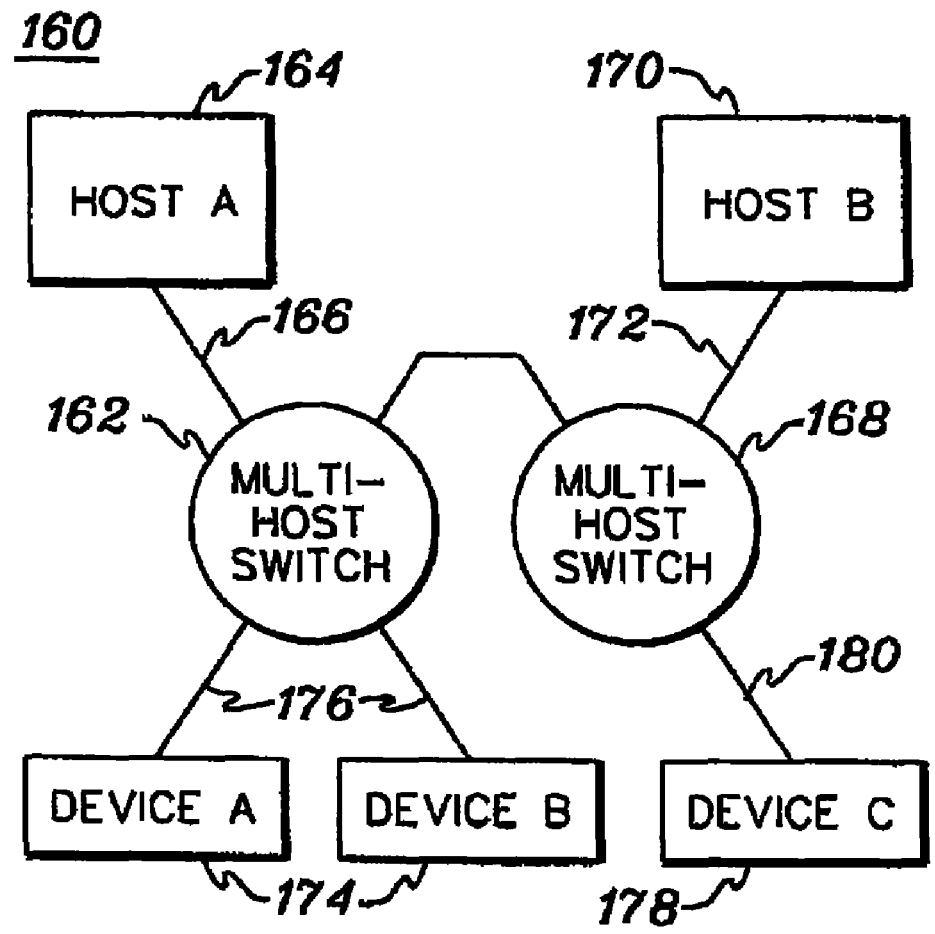

Various switch configurations that include one or more multi-host switches are described with reference to FIGS. 1A-1C. For instance, a configuration having one multi-host switch is described with reference to FIG. 1A; a configuration having one multi-host switch and multiple single host switches is described with reference to FIG. 1B; and a configuration having multiple multi-host switches is described with reference to FIG. 1C. These configurations are described in further detail below.

Referring to FIG. 1A, a switch configuration 100 includes a multi-host switch 102 coupled to a plurality of hosts 104 via a plurality of north facing ports 106, and to a plurality of devices 108 via a plurality of south facing ports 110. As examples, a host is a server, such as a p575 Power Server, offered by International Business Machines Corporation, Armonk, N.Y., or any other type of server or computing node; and a device is, for instance, an I/O device, a disk controller or other type of device.

Similar to the configuration of FIG. 1A, the configuration of FIG. 1B also includes one multi-host switch, but it also includes two single host switches. As shown in FIG. 1B, a switch configuration 130 includes a multi-host switch 132 coupled to a host 134 via a north facing port 136a and to a single host switch 138 via a north facing port 136b. Switch 138 has a north facing port 140 coupling the switch to a host 142 and a south facing port 144 coupling the switch to a device 146.

Multi-host switch 132 is further coupled to a device 148 and another single host switch 150 via south facing ports 152. Switch 150 is coupled to a plurality of devices 154 via south facing ports 156.

Another switch configuration is described with reference to FIG. 1C. As depicted in FIG. 1C, a switch configuration 160 includes a multi-host switch 162 coupled to a host 164 via a north facing port 166, and a multi-host switch 168 coupled to a host 170 via a north facing port 172. Multi-host switch 162 is further coupled to a plurality of devices 174 via a plurality of south facing ports 176. Similarly, multi-host switch 168 is coupled to a device 178 via a south facing port 180. This configuration is a loop configuration that allows at least two interconnected multi-host switches.

Figure 2A:
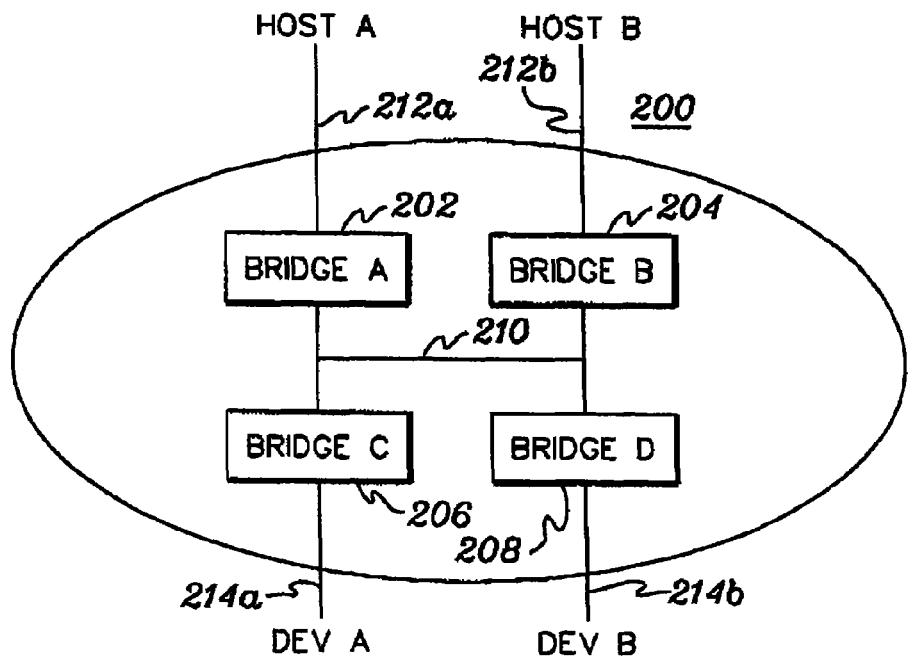
FIG. 2A depicts further details regarding the configuration of a multi-host switch, in accordance with an aspect of the present invention.

Further details regarding a multi-host switch are described with reference to FIG. 2A. A multi-host switch 200 includes a collection of bridges, e.g., PCIe to PCIe bridges, interconnected by a virtual PCI bus. For example, multi-host switch 200 includes bridges 202, 204, 206 and 208 interconnected by a PCI bus 210. Bridges 202 and 204 include north facing or upstream ports 212a, 212b to hosts (e.g., Host A and Host B, respectively), while bridges 206 and 208 include south facing or downstream ports 214a, 214b to devices and/or other switches. In this example, Bridges 202 and 204 are constructed to allow multi-host switching, including employing the routing mechanisms described below.

Figure 2B:
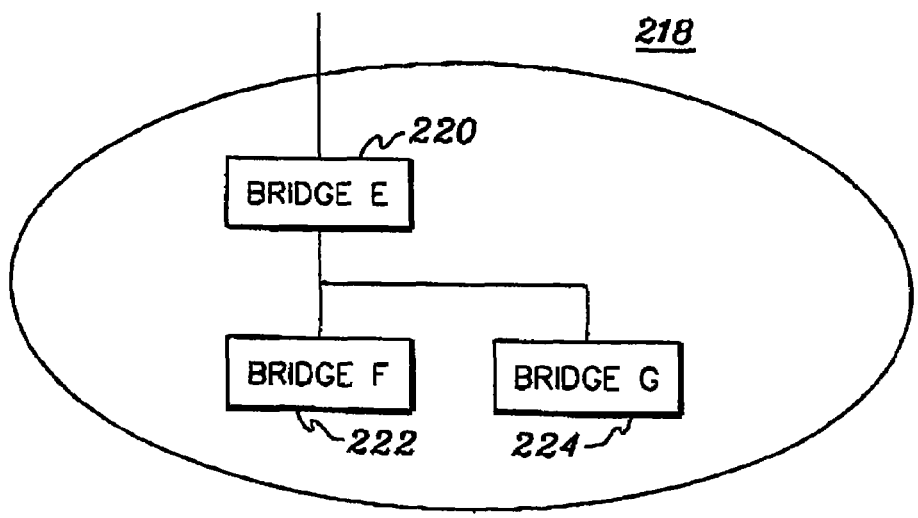
FIG. 2B depicts one example of a configuration of a single host switch used in accordance with an aspect of the present invention.

This configuration of a multi-host switch is compared to the configuration of a single host switch that allows connection to only one host. One example of a single host switch is described with reference to FIG. 2B. As shown, a single host switch 218 includes a bridge 220 to couple the switch to a single host. It also includes bridges 222 and 224 to couple the switch to devices and/or other switches. Unlike the multi-host switch, there is no additional bridge enabling a connection to another host.

Figure 3:
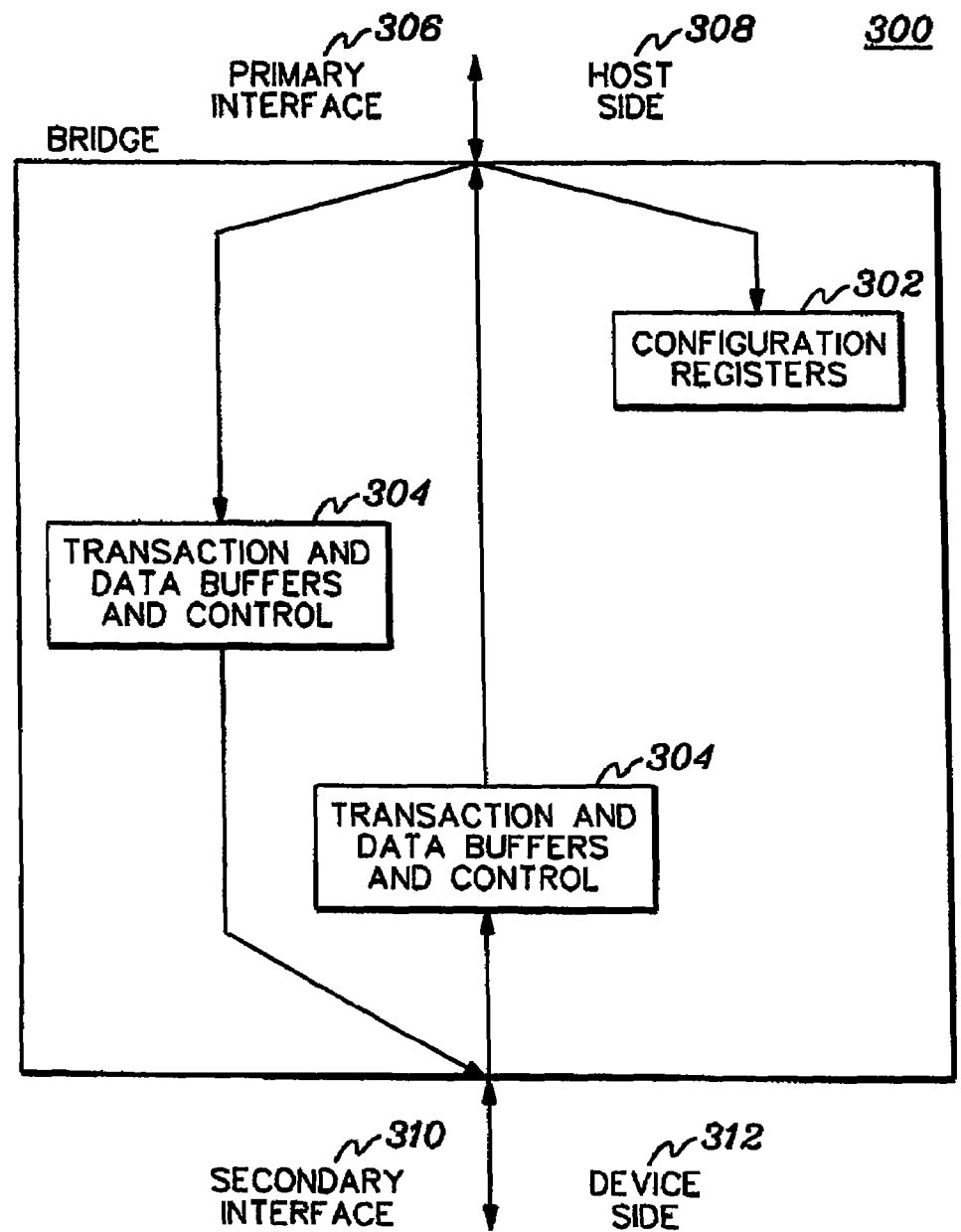
FIG. 3 depicts further details of a PCI to PCI bridge of a switch, in accordance with an aspect of the present invention.

A bridge of a switch, whether it be a multi-host switch or a single host switch, includes components used to define the bridge, transmit packets and perform other routing functions. Examples of these components are described with reference to FIG. 3. A bridge 300, such as a PCIe to PCIe bridge, includes, for instance, one or more configuration registers 302, as well as one or more sets of transaction and data buffers and control 304. The configuration registers include information used to describe and configure the bridge, and sets 304 include information used to control the routing of a packet through the switch. Sets 304 employ information in the configuration registers to perform the routing.

Bridge 300 also includes a primary interface 306 used to connect the bridge on the host side 308, and a secondary interface 310 used to connect the bridge on the device side 312.

Packets are received on the primary and secondary interfaces of a bridge. In response to receiving a packet, the bridge examines the packet to determine whether the packet should be forwarded through the bridge, dropped or consumed by the bridge. A number of mechanisms are used by the bridge to make the above determination. These mechanisms include, for instance, memory address routing, id routing and implied routing. The routing mechanism used depends on the operation code (opcode) in the packet. As examples, if the opcode indicates a read or write, then memory address routing is used; if it indicates a completion, id routing is used; and if it indicates an asynchronous message or interrupt message, implied routing is used. Each of these routing mechanisms is described in further detail below.

Figures 4A, 4B:
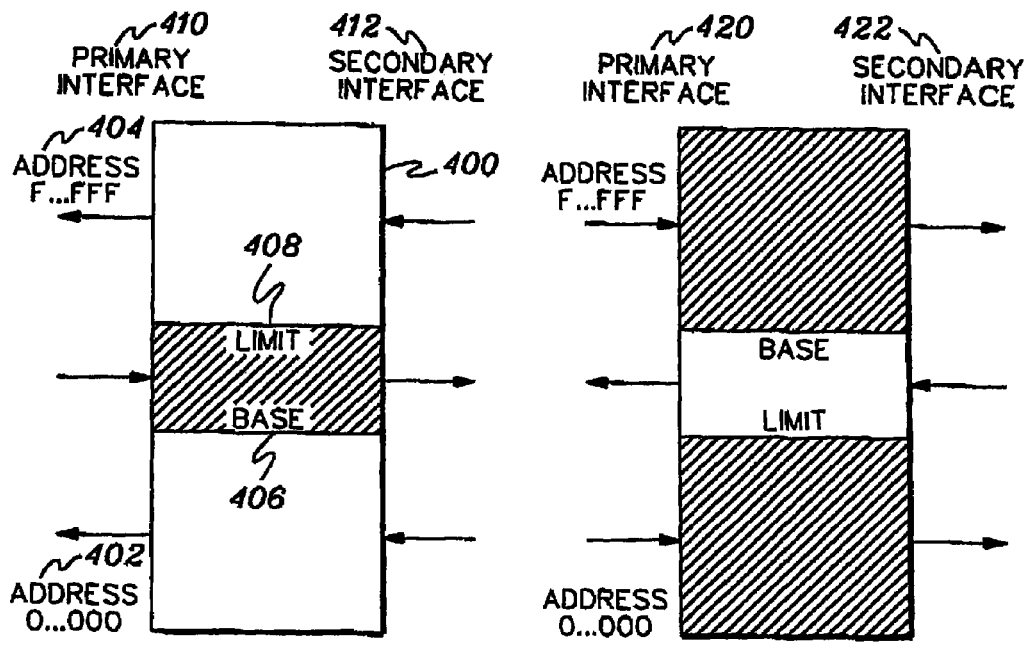
FIG. 4A pictorially depicts one example of memory address routing in which the address mode is base less than (<) limit, in accordance with an aspect of the present invention.
FIG. 4B pictorially depicts one example of memory address routing in which the address mode is base greater than (>) limit, in accordance with an aspect of the present invention.

Memory address routing with transparent bridges uses a single flat memory address space that is divided among the hosts, devices and bridges. As depicted in FIG. 4A, an address space 400 includes addresses 0 . . . 000 (402) through F . . . FFF (404), as examples. There is a base address 406 and a limit address 408, which are specified in the configuration registers. The base and limit addresses are used during the routing. For example, for a single host switch, the addressing mode is indicated as base less than (<) limit. Thus, if a packet is received on a primary interface 410 and the address falls within the base/limit values, the packet is forwarded to a secondary interface 412. Otherwise, the packet is not forwarded. Likewise, if the packet is received on secondary interface 412 and its address does not fall within the base/limit, it is forwarded to primary interface 410. Otherwise, the packet is not forwarded.

For the bridges on the host side of a multi-host switch, however, the addressing mode is indicated as base greater than (>) limit, which enables reverse routing. Referring to FIG. 4B, if a packet is received on a primary interface 420 and its address does not fall within the base/limit values, it is forwarded to a secondary interface 422. On the other hand, if the packet is received on secondary interface 422 and its address falls within the base/limit, it is forwarded to primary interface 420. Otherwise, the packet is not forwarded. (In single host switches, with the base>limit addressing mode, the bridge is defined to not pass any packets from the primary interface to the secondary interface and to pass all packets from the secondary interface to the primary interface.)

Figure 4C:
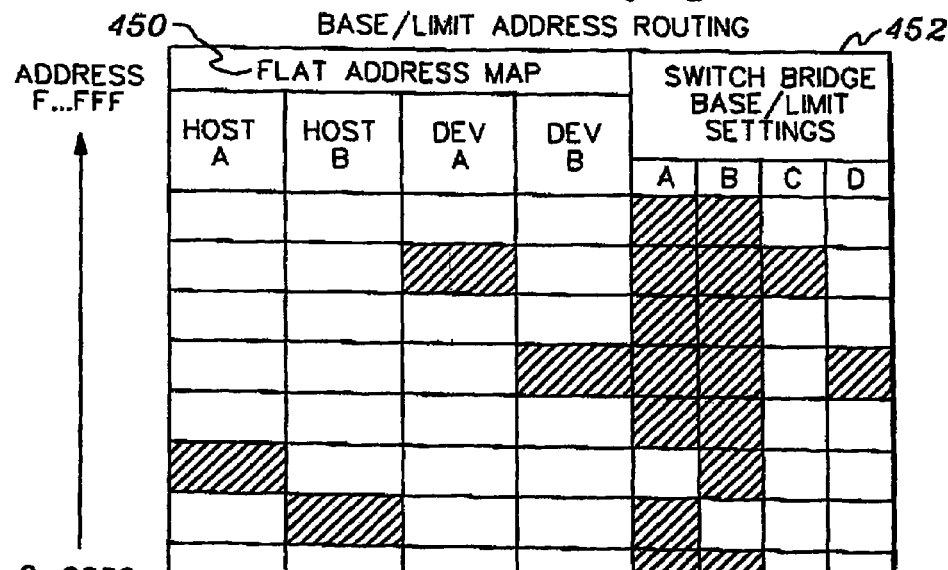
FIG. 4C depicts one example of a base/limit address routing table for the configuration of FIG. 2A, in accordance with an aspect of the present invention.

Examples of base/limit address ranges for a multi-host switch are described with reference to FIG. 4C. As depicted, a flat address map 450 is used for all of the hosts and devices of the switch. This switch has two hosts, Host A and Host B, and two devices, Dev A and Dev B (corresponding to the configuration as depicted in FIG. 1A and FIG. 2A). The address range for each host or device is shown by the shaded area under the specified host or device of flat address map 450. Further, under the heading Switch Bridge Base/Limit Settings 452, the shaded area indicates the area in which the packet is passed from the primary to the secondary interface. For instance, for Bridge A, the packet is passed from the primary interface to the secondary interface except in the unshaded area corresponding to the address range for Host A. The same is true for Bridge B. For Bridge A, the packet is passed from the secondary interface to the primary interface except in the shaded area corresponding to the address range not used by Host A. The same is true for Bridge B. However, for Bridges C and D, the shaded area indicates that the packet is passed from the primary interface to the secondary interface, and the unshaded area indicates that the packet is passed from the secondary to the primary interface. With this arrangement of memory address routing, packets can be routed through the multi-host switch from either device to either host, from either host to either device, from device to device, and from host to host.

As described above, in addition to memory address routing, a bridge also uses id routing to route packets when appropriate, as indicated by the opcode of the packet. As one example, id routing is used to send a completion to a request. Each request includes a requester id, which is provided in a completion to the request and used to guide the response through the switch. As one example, the requester id includes a bus number of the bus (or PCI bus segment) to which the requestor is attached. The requester id also includes a device number and a function number, however, these are not used for switch routing, in this example.

The bus number can represent one of a plurality of bus types depending on the bus (or bus segment) the requester is attached. For instance, each PCI to PCI bridge configuration space includes at least three bus numbers representing at least these buses. A primary bus number determines if a packet is to be consumed by the bridge, and it represents a primary bus, which is the bus segment to which the primary interface is connected (i.e., host side of the bridge). A secondary bus number represents the bus segment to which the secondary interface is connected (i.e., device side of the bridge), and a subordinate bus number represents the highest numbered bus segment subordinate to the bridge. In one aspect of the present embodiment, a root complex bus number or bus number bit array is optionally added which represents the root complex to which the bus is connected. These bus numbers are set in the configuration space. This can be performed by a manual process in which the overall configuration is examined and bus numbers are assigned based on any rules that are to be followed. These numbers are then stored in the configuration space for each bridge. Further details regarding id routing are described with reference to FIGS. 5A-5C.

Figure 5A:
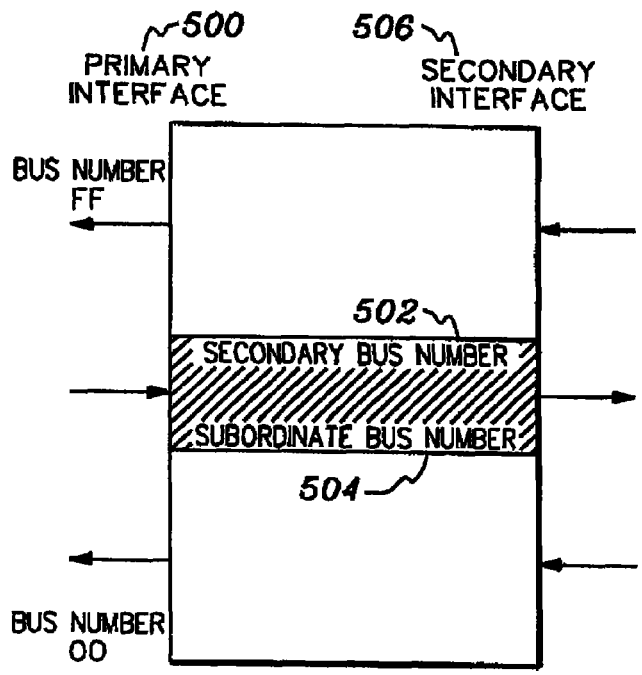
FIG. 5A pictorially depicts one example of id routing for a single host switch, in accordance with an aspect of the present invention.
Figure 5B:
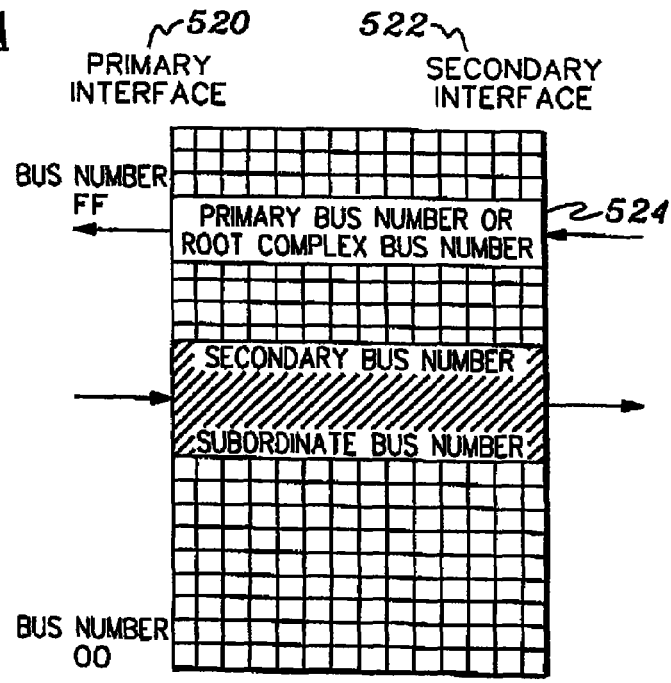
FIG. 5B pictorially depicts one example of id routing for a multi-host switch, in accordance with an aspect of the present invention.

Referring to FIG. 5A, for all bridges in a single host switch, if the packet is received on a primary interface 500 and its bus number in the requestor id falls within its secondary bus number 502 and its subordinate bus number 504, inclusive, the packet is forwarded to a secondary interface 506. On the other hand, if the packet is received on secondary interface 506 and its bus number in the requestor id does not fall within its secondary and subordinate bus numbers, then the packet is forwarded to primary interface 500. Otherwise, the packet is not routed.

For the host side bridges in a multi-host switch, packets received on a primary interface 520 (FIG. 5B) are handled as described above. However, for bridges attached directly to a root complex, if a packet is received on a secondary interface 522 and its bus number in the requestor id matches the primary bus number 524, the packet is forwarded to the primary interface. For bridges not directly attached to a root complex, if a packet is received on the secondary interface and its bus number in the requester id matches the root complex bus number 524, the packet is forwarded to the primary interface.

Figures 6A, 6B:
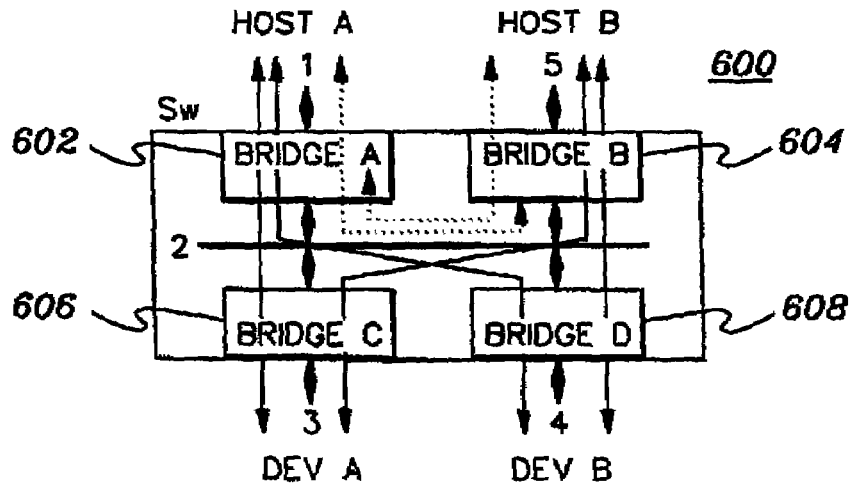
FIG. 6A depicts a multi-host switch with bus numbers applied to the bridges thereof, in accordance with an aspect of the present invention.
FIG. 6B depicts one example of a requestor/completer id routing table for the configuration of FIG. 6A, in accordance with an aspect of the present invention.

Further details regarding id routing are described with reference to FIGS. 6A and 6B. Depicted in FIG. 6A is a switch 600 including a Bridge A 602, Bridge B 604, Bridge C 606 and Bridge D 608. The solid lines depict functional paths through the switch and the dotted lines depict configuration paths. The bus numbers for the bridges are indicated in the diagram. For instance, the primary bus number for Bridge A is 1, for Bridge B is 5, Bridge C is 2 and Bridge D is 2. The secondary bus number for Bridge A is 2, for Bridge B is 2, for Bridge C is 3 and for Bridge D is 4; and the subordinate bus number for Bridge A is 4, for Bridge B is 4, for Bridge C is 3 and Bridge D is 4. These values are stored within configuration registers, and are shown herein, for clarity, in a Requestor/Completer Id Routing table depicted in FIG. 6B. Also shown in the table of FIG. 6B is the root complex bus numbers for the bridges. As shown, for Bridges A and B, the root complex bus numbers are their primary bus number because Bridges A and B are connected directly to root complexes, and Bridges C and D do not have such a number.

Figures 7A, 7B:
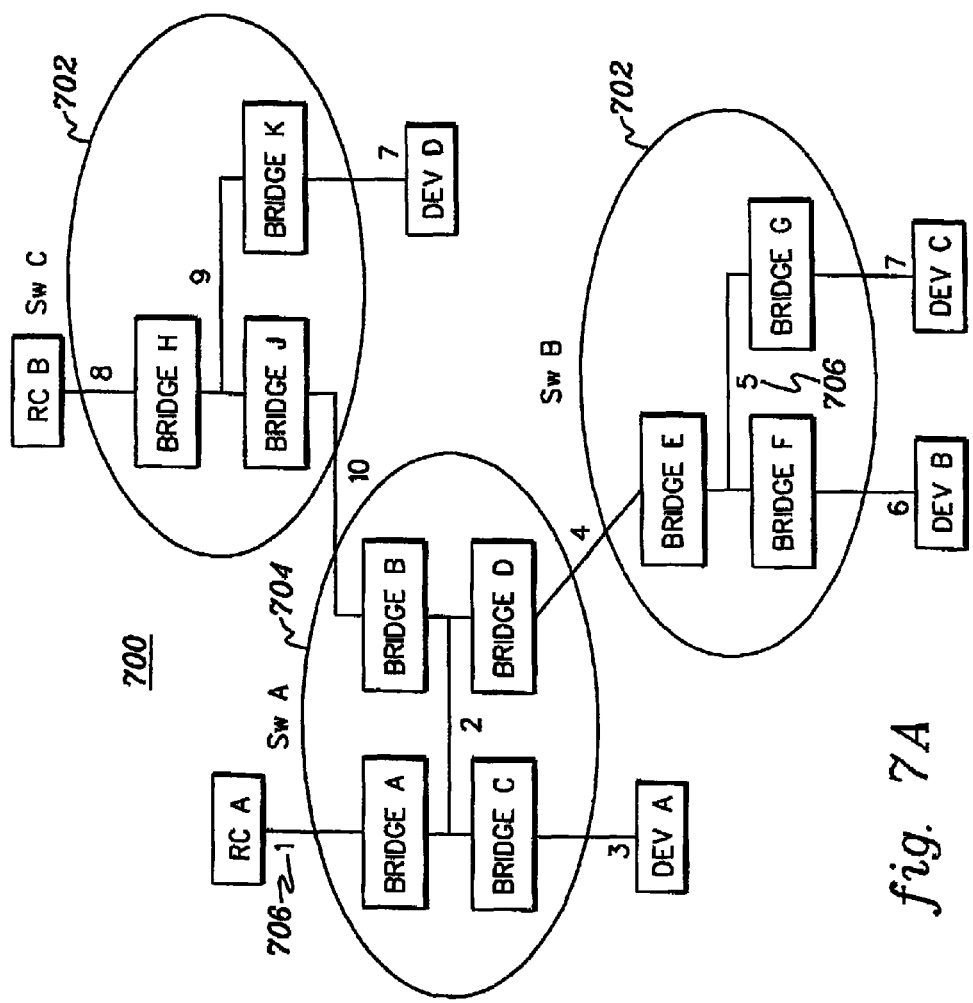
FIG. 7A depicts further details of the switch configuration of FIG. 1B, which includes one multi-host switch and a plurality of single host switches, in accordance with an aspect of the present invention.
FIG. 7B depicts a requestor/completer id routing table for the configuration of FIG. 7A, in accordance with an aspect of the present invention.

A further example of multi-host switch id routing is described with reference to FIGS. 7A-7B, which show further details of FIG. 1B. In particular, FIG. 7A depicts a switch configuration and FIG. 7B depicts the bus numbers associated therewith. Referring to FIG. 7A, a switch configuration 700 includes a plurality of single host switches 702 coupled to a multi-host switch 704. Single host Switch B includes Bridges E, F and G, and single host Switch C includes Bridges H, J and K. Multi-host Switch A includes Bridges A, B, C and D. The requestor/completer ids associated with those bridges are depicted in FIG. 7A and summarized in the table of FIG. 7B.

In this example, Bridge B of multi-host switch A 704 is not directly connected to a root complex, but instead is connected to single host switch C 702. In this case, the root complex bus number in the configuration space is compared to the packet bus number of the id of packets received on the secondary interface. If the bus numbers match, the packet is forwarded to the primary interface. However, Bridge A of multi-host Switch A 704 is directly connected to a root complex, so the primary and root complex bus numbers are the same, and the primary bus number may be used for routing packets received on the secondary interface.

Figure 8:
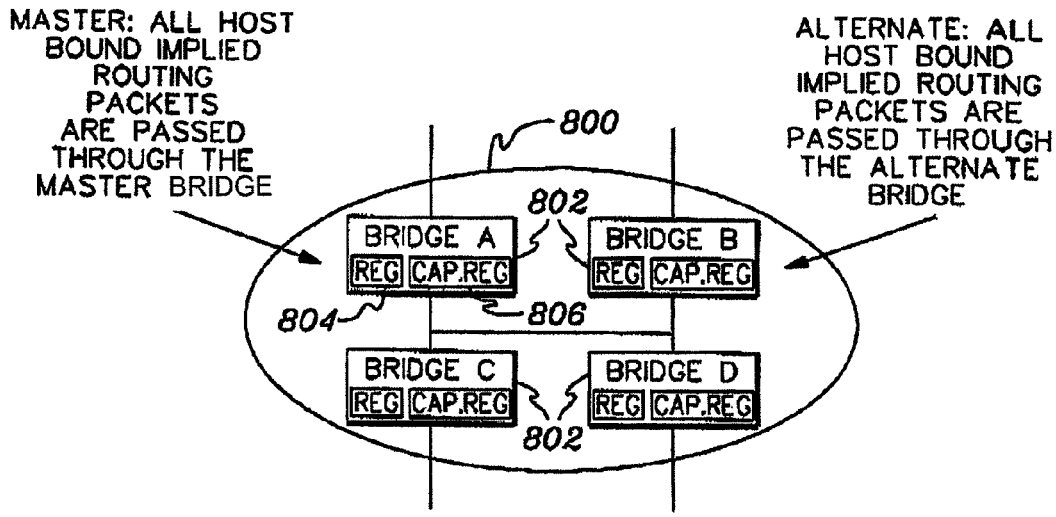
FIG. 8 depicts one example of implied routing within a multi-host switch, in accordance with an aspect of the present invention.

Another type of routing is the implied routing, which is described with reference to FIG. 8. As depicted in FIG. 8, a multi-host switch 800 has a plurality of bridges 802. For certain types of implied routing packets, such as error alert packets, Bridge A is considered the master, in this example, and therefore, all host bound implied routing packets are passed through the master bridge, Bridge A. Bridge B, in this example, is considered the alternate bridge. If the alternate bridge is given control, then all host bound implied routing packets are passed through the alternate bridge, Bridge B. An indication of the master/alternate can be provided in a register 804 in memory space of each bridge or in a capability register 806 in the bridges' configuration space, as described further below.

Multi-host switches may be configured in a number of different ways. One such configuration is a ring configuration, which is described with reference to FIG. 9A, which provides further details of FIG. 1C. A switch configuration 900 includes a multi-host switch 902 coupled to a multi-host switch 904. Each switch includes a plurality of bridges. Switch 902 is capable of accessing Host A via Bridge A 908 and Host B via Bridge B 910. It uses the buses associated with Bridge B 912 and Bridge A 914 to access Bridge B 910. Similarly, switch 904 can access Host A and Host B.

Figure 9A:
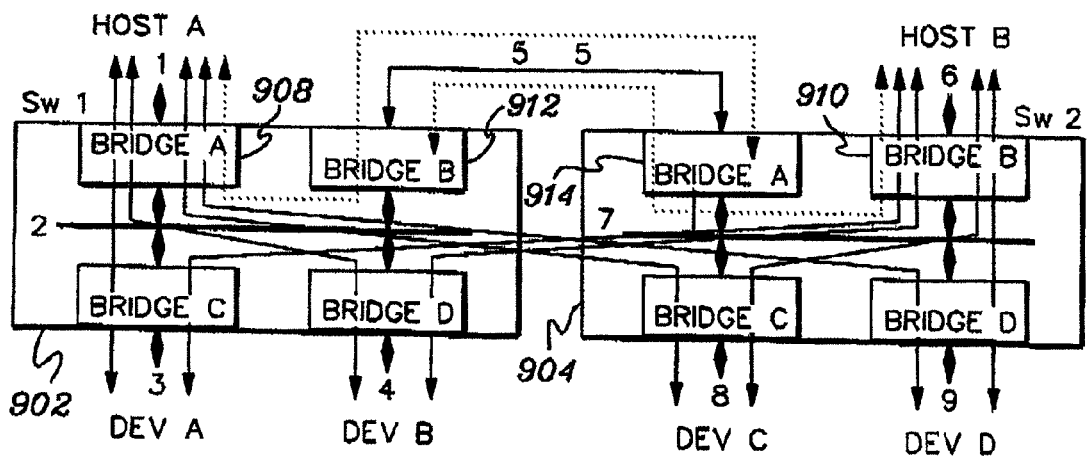
FIG. 9A depicts an example of a ring configuration using multiple multi-host switches, in accordance with an aspect of the present invention.
Figure 9B:
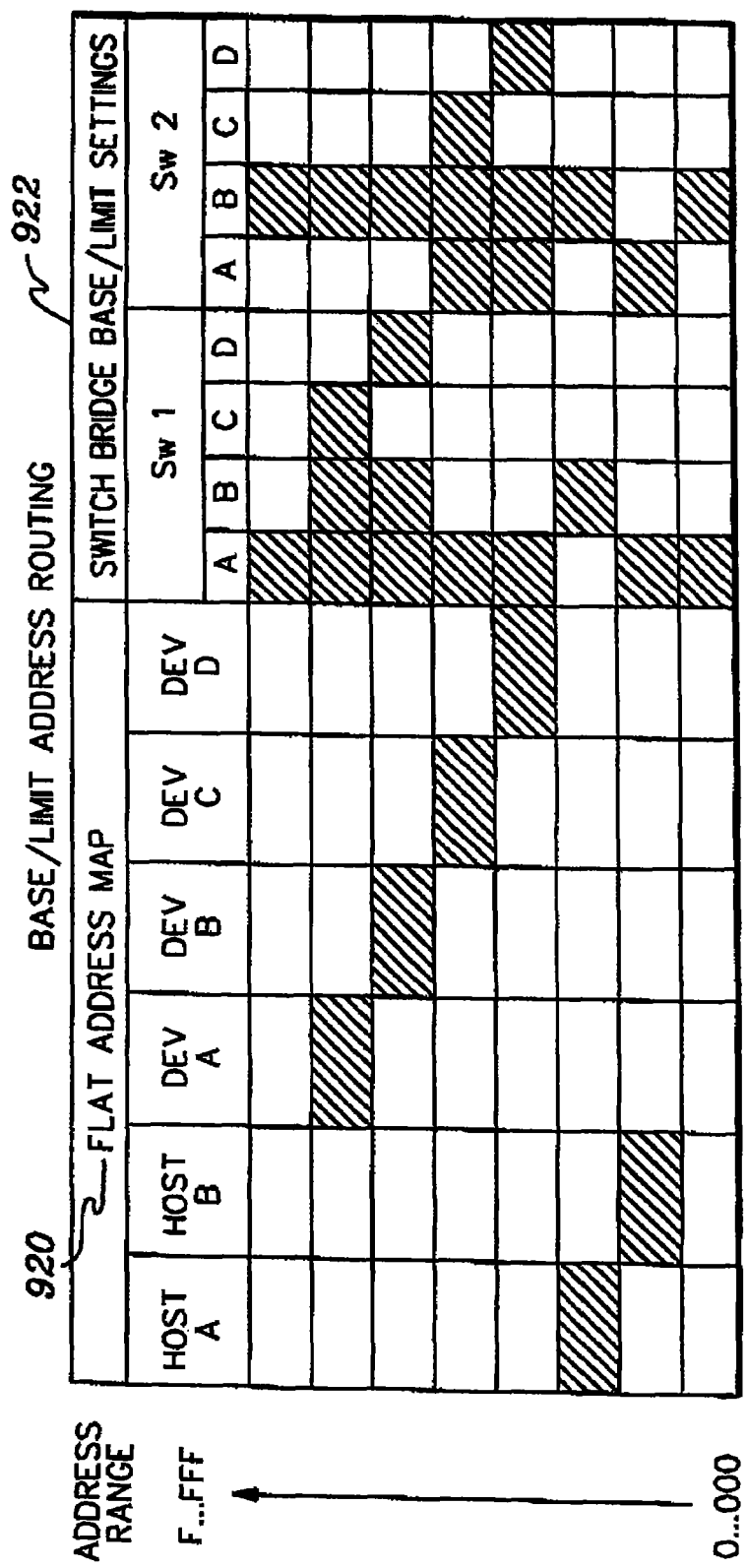
FIG. 9B depicts one example of a base/limit address routing table for the configuration of FIG. 9A, in accordance with an aspect of the present invention.

Further, referring to FIG. 9B, an example of the address ranges within a flat address map 920 for the various hosts and devices of the configuration of FIG. 9A is depicted, along with the Switch Bridge Base/Limit Settings 922. Note that Bridge B 912 of Switch 1 902 does not have a contiguous memory address routing range. In this case, a second set of base/limit address registers are added to Bridge B's configuration space to perform the routing depicted in FIG. 9B. These added base/limit registers are capability registers, which are further described below. Likewise, Bridge A 914 of Switch B 904 requires the same added capability registers. As more multi-host switches are added to the loop, more sets of base/limit capability registers are added to the bridges.

Additionally, in FIG. 9C, an example of a Requestor/Completer Routing Id table is depicted for the ring configuration of FIG. 9A. With this example, the requestor/completer id routing becomes fragmented requiring many root complex bus number registers. Thus, a bus number bit array 930 replaces the root complex bus numbers in Bridges 1A, 1B, 2A and 2B. The bus number bit array may also replace the root complex bus numbers in Bridges 1C, 1D, 2C and 2D, if desired. As more multi-host switches are added to a loop, the bus number bit array can handle the added fragmentation.

As described above, one or more capability registers are used in the different addressing modes. For instance, one capability register is used for implied routing. This register includes, for instance, a bit that controls if the bridge of the switch is the master. The control logic of the bridge accesses this configuration register in determining the routing.

There are also one or more other capability registers in the configuration space of each bridge that include other available mode controls usable with the other addressing mechanisms. These mode controls (e.g., bits within one register, or 1 bit in each register of a plurality of registers) include, for instance, the following:

In one embodiment, each host side bridge in a multi-host switch has the following control bits:
1) Direct Root Complex Connection Mode. When a bridge in a multi-host switch is connected directly to a host, the id bus number in packets received on the secondary interface is compared to the primary bus number of the bridge. If the bus numbers match, the packet is forwarded to the primary interface.
2) Indirect Root Complex Connection Mode. When a bridge in a multi-host switch is not connected directly to a host and is connected to the host through one or more singe host switches, the id bus number in packets received on the secondary interface is compared to the root complex bus number in the bridge. If the bus numbers match, the packet is forwarded to the primary interface.
3) Loop Mode. When more than one multi-host switch is connected in a loop, for the bridges facing the host, the id bus number in packets received on the secondary interface are used as an index into the bus number bit array. If the corresponding bit is set, the packet is forwarded to the primary interface.
4) As an alternative implementation to Limit>Base, Inverted Memory Address Routing Mode. When this bit is set, the base is smaller than the limit, and packets are routed from the primary interface to the secondary interface, when the address does not fall between the base and the limit.

These mode controls are used to direct the routing mechanisms used by the bridges in routing packets. In addition to the configuration capability registers, the configuration spaces of the bridges of the multi-host switches that are north facing are address mapped to address spaces in the device spaces of the north facing bridges in the switch. For example, in FIG. 6A, Host A can access Bridge B's configuration space through a memory map in Bridge A. Likewise, Host B can access Bridge A's configuration space through a memory map in Bridge B.

Described in detail above is a transparent PCI-based multi-host switch that enables a switch to be connected to multiple hosts. This allows data to be sent to multiple hosts concurrently for back-up purposes. The multi-host switch can be included in many switch configurations. Although various configurations are described herein, these are only examples. There are numerous other configurations that can include one or more multi-host switches. A configuration can include one, two or more of such switches, as well as zero or more single host switches. Further, each multi-host switch can connect to two or more hosts. Two hosts are shown herein only as examples. Many variations are possible without departing from the spirit of the present invention. The hosts in these examples are independent hosts, such as separate SMPs or separate CECs. Other hosts may be included.

One or more aspects of the present invention can be included in an article of manufacture (e.g., one or more computer program products) having, for instance, computer useable media. The media has therein, for instance, computer readable program code means of logic (e.g., instructions, code, commands, etc.) to provide and facilitate the capabilities of the present invention. The article of manufacture can be included as a part of a computer system or sold separately.

Figure 10:
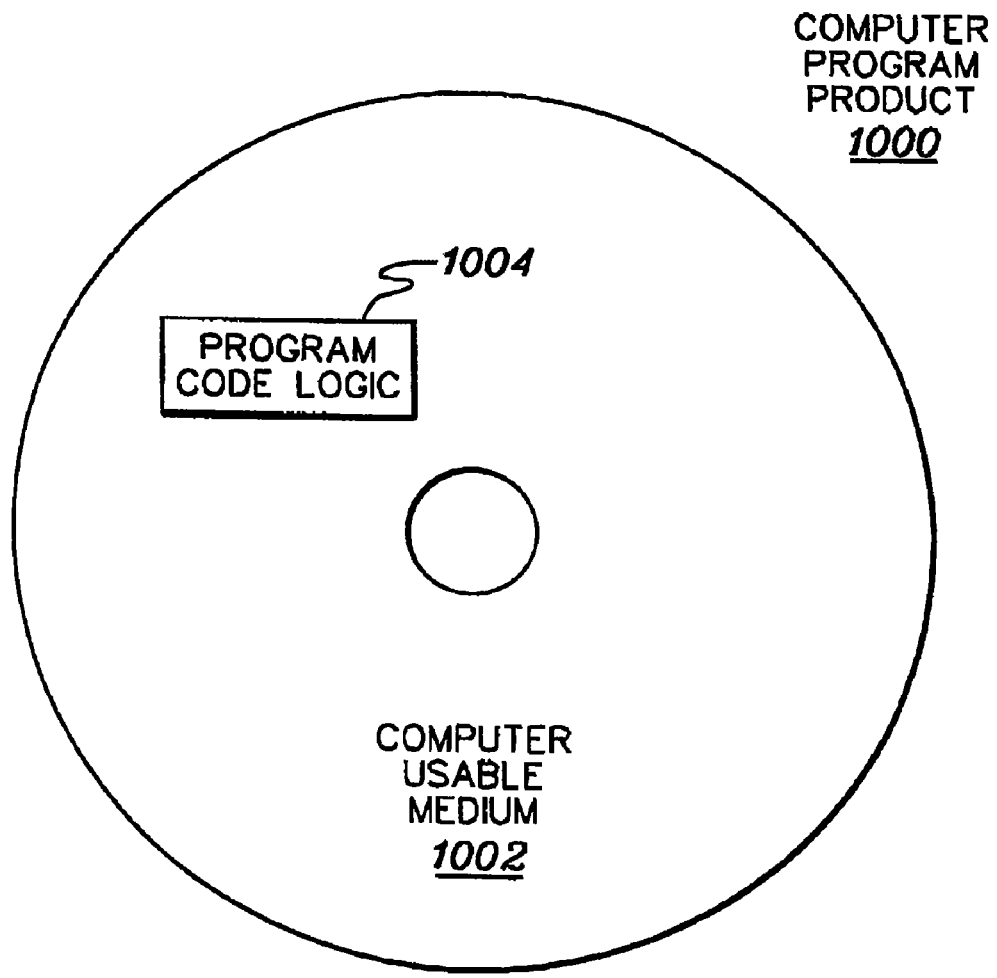
FIG. 10 depicts one embodiment of a computer program product incorporating one or more aspects of the present invention.

One example of an article of manufacture or a computer program product incorporating one or more aspects of the present invention is described with reference to FIG. 10. A computer program product 1000 includes, for instance, one or more computer usable media 1002 to store computer readable program code means or logic 1004 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a multi-host switch is provided that includes two or more north facing capable ports, each connected to different hosts through different root complexes. In this example, each north facing port may be operated as a standard PCI-Express north facing port for data transfer. To provide accurate routing of packets through the switch, the PCI-Express specified base/limit address, requestor/completer id and implied routing capabilities are extended to operate and configure such a switch. Pairs or more of these switches can be interconnected into a ring structure or other configuration, in which case one or both of the north facing ports operates as both a north facing and south facing port at the same time. Advanced switching is provided without added costs, latency and complexity. The multi-host switch described herein is transparent in that the packets being routed through the switch do not need to be modified and addresses do not need to be translated, allowing better reliability.

Advantageously, a PCI-based multi-host switch is provided that largely complies with the PCI-to-PCI bridge specification, and provides connections to multiple hosts. Enhancements to the memory address and id routing mechanisms are provided. With id routing, the id of the root complex is known to the bridges. The configuration spaces of the bridges attached to the host are accessible to all hosts by mapping them into the address space of the bridges (i.e., the device of the bridge). Host-to-host communication is supported. Multiple mode bits control the operation, including, for instance, alternative to base>limit mode bit, and id routing to root complexes may be enabled or disabled. Further, ring topologies are provided in which bridges may be enabled to be north or south facing. Advantageously, each host can have an arbitrary memory address range, as long as it is unique.

Although various embodiments are described herein, these are only examples. For instance, a multi-host switch may be connected to more than two hosts and may be included in configurations other than those described herein. Further, each bridge of a multi-host switch may be other than a PCIe to PCIe bridge. The bridges may be based on other PCI architectures, including, but not limited to, future PCI technology. Additionally, the routing techniques described herein are examples. Other variations may be made to the routing techniques without departing from the spirit of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of routing information within a processing environment, said method comprising:
    employing a transparent PCI-based switch to route information between one or more hosts and at least one of one or more devices and one or more other switches of the processing environment, said switch being coupled to multiple hosts of the processing environment, wherein the information is within a packet, and wherein the employing comprises receiving the packet at a bridge of the switch and routing the packet by the bridge based on data within the packet, wherein the routing comprises using at least one of memory address routing, id routing and implied routing to route the packet, and wherein the routing is memory address routing and an address mode of the memory address routing specifies a base address value greater than a limit address value.

2. The method of claim 1, wherein the switch is concurrently coupled to the multiple hosts.

3. The method of claim 1, wherein the switch is further coupled to another multi-host switch via a downstream port of the transparent PCI-based switch.

* * * * *